May 2, 1944. J. A. HEANY 2,347,685
BAUXITE PROCESS AND PRODUCT
Filed March 16, 1937

STEP-1
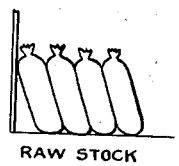
RAW STOCK

STEP-2
NET WEIGHT

STEP-3
PRE HEAT TREATMENT
DEHYDRATION

STEP-4
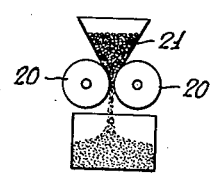
CRUSHER

STEP-5
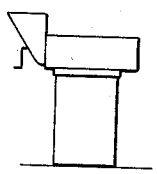
SCREENED

STEP-6
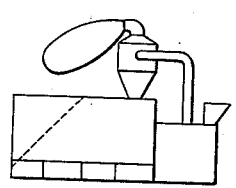
HAMMER MILL AND
SEPARATOR

STEP-7
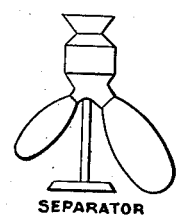
SEPARATOR

STEP-8
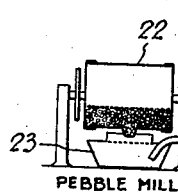
PEBBLE MILL

STEP-9
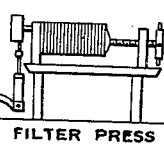
FILTER PRESS

STEP-10
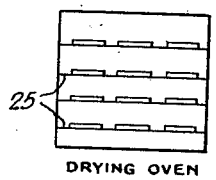
DRYING OVEN

STEP-11
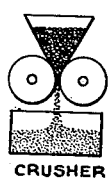
CRUSHER

STEP-12
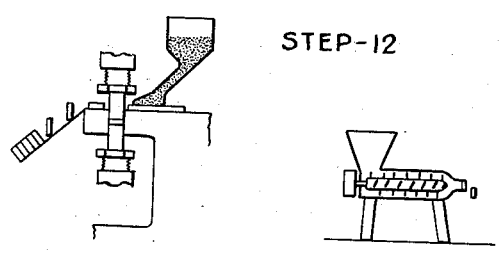
PRESS OR PUG MILL

STEP-13
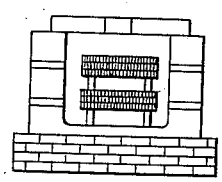
FURNACE OR KILN FIRING

INVENTOR
John Allen Heany
BY
Braselton Whitcomb & Davies
ATTORNEYS

Patented May 2, 1944

2,347,685

UNITED STATES PATENT OFFICE 2,347,685

BAUXITE PROCESS AND PRODUCT

John Allen Heany, New Haven, Conn., assignor to Heany Industrial Ceramic Corporation, Rochester, N. Y.

Application March 16, 1937, Serial No. 131,126

12 Claims. (Cl. 106—65)

The present invention relates to a process of making ceramics, abrasives and similar substances from aluminous materials, and it particularly relates to making and preparing ceramics entirely from aluminous materials such as bauxite preferably without additions of fluxing, bonding or other foreign materials.

It is to be understood, of course, that the procedures disclosed in the present application, although illustrated in connection with their application to bauxite without additions, may be employed with precipitated hydrated aluminum oxides and also, if desired, with the inclusion of vitrifying catalysts, such as small amounts of magnesium and alkali metal compounds and particularly oxides or water soluble salts such as magnesium oxide, caustic soda or potash, or various sodium and potassium salts.

Bauxite as it usually is found in nature is composed primarily of hydrated alumina or aluminum hydroxide, the amount of aluminum oxide ranging from 50% to 60%. This aluminum oxide is combined with relatively smaller amounts of iron oxide, say from ¼% to 5%; silica, say from 3% to 15%; titanium oxide, say from 1½% to 5%, the residue being combined water. Upon calcining or igniting, it is possible to remove this combined water with an ignition loss varying from 25% to 33%.

Although alumina has been found to be a most satisfactory component of ceramic articles, considerable difficulty has been encountered in processing the bauxite so as to produce ceramic materials of satisfactory qualities and properties.

The iron, silicon and titanium oxides appear to disadvantageously affect the alumina and particularly seem to prevent most satisfactory transformation thereof into dense, hard and high quality ceramics of the type most desired for commercial purposes, and it is necessary to use relatively large quantities of bonding or fluxing agents which decrease the purity of the ceramic and render it less refractory.

Frequently the bauxite, when processed to produce a ceramic, will result in materials which are not hard, or which are of low specific gravity, or which are of crystalline structure. In addition, the materials produced may not be vitreous, homogeneous, and will oftentimes be porous. Furthermore, it is frequently necessary to employ high temperatures sufficient to fuse the alumina material, with resulting increased cost and the necessity of utilizing expensive electric furnace equipment. Moreover, with such electric furnace fusion treatments, the alumina will become crystalline and will not be of a satisfactory character for many ceramic purposes.

It is among the objects of the present invention to produce ceramic articles from natural mineral bauxite which are hard, amorphous, dense, homogeneous, vitric-like, non-porous, and which may be readily and inexpensively manufactured without the necessity of resorting to expensive fusion processes or of including bonding or fluxing agents.

Other objects will become apparent during the course of the following specification.

According to the present invention it has been found possible to produce hard, vitreous or vitric-like, homogeneous, non-porous and amorphous ceramic articles useful for many purposes, by finely dividing the dehydrated amorphous bauxite until it becomes of colloidal nature, followed by forming and firing at temperatures below 1500° C. or between 1000° C. and 1500° C. The preferred firing temperature is about 1350° C. or between 1350° C. and 1450° C.

It is desirable that the bauxite be first dehydrated at a relatively low temperature around the red heat or at about 500° C. to 600° C. to drive off all or substantially all of the water and volatile material, following which the dehydrated bauxite is crushed and then ground in successive operations until a majority of the particles are of a size smaller than 50 microns and preferably of a size not more than 12 microns (0.00047244") and have become mechanically hydrated or hydroxylated. This finely divided dehydrated bauxite appears to be ceramically active and to be subject to processing by ceramic methods to give various types of refractories, abrasives, and so forth, of particularly high quality.

It appears that continued wet grinding of the dehydrated bauxite will cause the dehydrated bauxite to achieve a reactive state or colloidal condition in which it may be most readily vitrified to a dense, hard, non-porous substance in spite of the fact that it contains substantial quantities of iron, titanium and silicon oxides, and without bonding or fluxing agents or vitrifying catalysts.

To give a detailed procedure, the crude bauxite which may be obtained from Alabama or Arkansas is of the following compositions:

| Alabama | Per cent | Arkansas | Per cent |
|---|---|---|---|
| $Al_2O_3$ | 57 | $Al_2O_3$ | 58 |
| $Fe_2O_3$ | ½ | $Fe_2O_3$ | 4 |
| $SiO_2$ | 11 to 12 | $SiO_2$ | 5 to 6 |
| $TiO_2$ | 2½ to 3 | $TiO_2$ | 3 to 3½ |
| Ignition loss | 29 to 30 | Ignition loss | 30 |

This bauxite is heated to 500° C. to 600° C. to drive out about 27% to 28% of the combined water and volatile matter, the temperature during this dehydration operation preferably never exceeding a dull red heat. It is undesirable to push this dehydration to completion—that is, to more than 90% to 95% of the total ignition loss—because this may result in elevating the bauxite material in part or whole to too high a temperature, at which the bauxite appears to become coagulated, hard and lumpy, rendering it difficult to reduce it to the desired state of fineness of 12 microns or finer, which appears to be essential according to the preferred procedure of the present invention.

The dehydrated bauxite material should at all times be amorphous and plastic and be substantially devoid of any foreign gritty particles which are most difficult to reduce to a fine state of subdivision.

This heated or calcined bauxite is then passed through crushing rolls to crush the large lumps. The crushed material is then fed to a grinding mill, such as a hammer mill, to form a ground product consisting primarily of a dust or fine powder preferably averaging less than about 200 mesh.

The ground bauxite is now passed through a Beach-Russ separator where particles over 200 mesh size are separated, these larger separated particles being returned to the grinding mill for regrinding. The fine material which results from the grinding is now placed in a pebble or ball mill where it is ground in water for a number of hours, with the result that the character of the aluminous particles appears to change and the material becomes colloidal in nature and tends to remain in suspension in water. Preferably the grinding may be continued for ten to seventy hours with from one to five parts of water per part of dehydrated and crushed bauxite, but with varying types of bauxite materials the grinding may take place for a shorter or longer time and with different amounts of water to give this final aluminous product the desired colloidal characteristics.

In any case, at least 50% to 80% of the wet ground material should have a size ranging substantially less than 50 microns, and at least 50% should be finer than 20 microns. It is important that the particle size of the ground material be approximately uniform.

As a typical mixture which is produced as a result of this grinding process, the following may be given:

| Particle size in microns | Per cent of particles finer |
|---|---|
| 41 | 98.0 |
| 23 | 90.0 |
| 16 | 88.0 |
| 12 | 73.0 |
| 12 | 4.5 |
| 6.5 | 4.5 |

In a preferred procedure, substantially all of the material may range from .5 to 15 microns in size, or from 0.0001" to 0.0009" in diameter. In any case, the major portion of the particles should be about 12 microns in size or finer, since this average size appears to give maximum density and proper shrinkage to the ceramic produced.

The grinding operation is now completed and the product is of a light, creamy consistency in which the mechanically hydrated colloidal aluminous material tends to remain suspended in the water present. The iron, titanium and silicon oxides also appear to become colloidal and hydrated and to aid, rather than prevent, subsequent vitrification.

It is important that the crushing, grinding and colloidizing processes each successively reduce the dehydrated bauxite without causing such material to take up any outside impurities such as may be derived from the walls of the grinding apparatus or from the balls, pebbles, or crushing rolls thereof. The crushing and grinding mills and the ball or pebble mills are preferably constructed of such materials as will be resistant to substantial attrition, either by the dehydrated bauxite or by the grinding operation, as might result in substantial amounts of foreign materials becoming mixed in with the dehydrated bauxite.

The wet, finely divided and creamy dehydrated bauxite mixture is then passed through a 200 mesh screen in order to remove any sandy particles or chips which may have been picked up during the grinding operations, and finally the material is passed through a filter press.

The filter cakes produced should preferably contain between about 12% and 18% of water, with an optimum of 15% of water, and the filter cake is then dried. The dried filter cake is then disintegrated or broken up to form a coarse or fine powder or pulverulent material, and this pulverulent material may be formed by suitable ceramic processes such as by slip casting, extruding or molding into various shaped articles which may then be fired. The material may also be pugged into bars, and the bars cut into various lengths or wads without separation of water. The forming may be done in the dry or wet, or with suitable organic binders.

The formed articles are now fired. The preferred firing temperatures are preferably between 1350° C. and 1450° C., although temperatures varying from 1200° C. to 1500° C. may be utilized in certain instances.

The shrinkage during the firing operation is approximately 27% to 30%, and the final material produced should be dark in color, non-porous, vitreous-like in nature, and very dense with a conchoidal fracture, a specific gravity of 3.53 and a hardness of 70 to 72 on the C scale of the Rockwell hardness machine. During the firing the material will shrink about 15% up to 1200° C. and about 20% up to 1300° C. At 1350° C. to 1400° C. a further shrinkage of about 10% additional takes place with a definite change in the product from a soft, porous, buff-color, low density material to a non-porous, dense, vitreous-like mass of dark hue.

The final ceramic materials produced may be utilized for stoneware, refractory bricks, abrasives, nozzles for sand blasting, dies for wire drawing, crucibles, refractory vessels, tubing, translucent panels, pyrometer tubes, dies, furnace linings, muffles, combustion tubes, tiles, combustion boats, pebbles for pebble mills, non-slip treads, mortars and pestles, casseroles, spatulas, hearth plates, saggers, jaws for crushing apparatus, drills, chemical stoneware, pottery, textile guides, electric furnace cores, bearings for clocks and instruments, linings for ball and pebble mills, and so forth.

In the accompanying drawing, which shows in diagrammatic fashion the various steps utilized in obtaining the desired ceramic according to the present invention:

Step 1 indicates the raw stock consisting of bagged bauxite, obtained from suitable mines in Alabama, Arkansas or elsewhere.

Step 2 indicates the segregation or weighing of the material into the desired batches for the dehydration treatment.

Step 3 represents the dehydration treatment of a batch of the material at a temperature of 500° C. to 600° C. and not above a red heat.

Instead of the batch treatment as indicated in step 3, it is also possible to use a continuous process in which the raw bauxite in its natural conglomerated or pisolitic condition is fed into a revolving or rotary furnace, as for example, of the "Ruggles-Cole" type.

In step 4 the dehydrated bauxite—ignition loss about 28% to 29%—is passed between crushing rolls 20 from the feeding funnel 21 in which the dehydrated bauxite is dumped. It is important that the material be crushed uniformly before being subsequently further finely divided so that there will be less chance of the bauxite taking up foreign materials from the walls or implements of the grinding or subdividing apparatus, as it would if too great a subdivision were accomplished in a hammer or pebble mill.

As indicated in step 5, the bauxite is then screened so that the dehydrated bauxite treated will be substantially of a uniform initial size when it is passed into the hammer mill of step 6.

As indicated both in step 6 and in step 7, the larger particles are separated, preferably by a 200 mesh screen, and the larger particles which have been separated may be returned to the prior step or subdividing operation to again be ground or pulverized, as the case may be.

The separator of step 7 may conveniently be of the Beach-Russ type.

Step 8 preferably includes wet grinding in a pebble mill and the material discharged from this pebble mill 22 into the pan 23 may be screened, as through a 200 mesh screen to remove sand or particles picked up during the grinding, and then it may be conducted by the conduit to the filter press diagrammatically indicated in step 9. The water may vary from one-half to three times the weight of the dehydrated bauxite.

In step 10 the filter cake is dried upon the shelves 25, preferably to about 8% to 10% of water or less.

In step 11 the dried filter cake is crushed. The filter cake may also be formed or pugged directly without drying and crushing.

In step 12 the material is passed through a press or pug mill. In the press the material may be pressure-molded in the dry or with a lubricant. The pug mill may be of the type manufactured by the Ceramic Machine Company, or of the type known as the F-R-H Vacuum Pottery Pug Mill, manufactured by the Fate-Root-Heath Company of Plymouth, Ohio. In these pug mills pressure and vacuum may be applied to draw out the air from the mass so that the extruded substance is substantially devoid of air and gas bubbles. This will result in a denser and more homogeneous aluminous ceramic.

The pug mill is preferably provided with knives to first cut up the crushed filter cake, following which the material is picked up by an auger or Archimedes screw which presses out the material through dies to form sheets or cylinders. The mass extruded from the pug mill preferably has the consistency of a thick dough and is termed a wad or stiff mud. The extruded mass may be pressed into a die or formed in a forming machine, a jigger lathe or other apparatus to produce articles as above described.

Finally, the material, after being formed between steps 12 and 13, is fired at a temperature of 1200° C. to 1400° C. in the fuel-fired furnace or kiln of step 13. The kiln may be a periodic kiln or a tunnel kiln.

If desired, however, the dehydrated and pugged bauxite resulting from step 12 may be cut up into small pieces, dried and then fired at a temperature of 1000° C. to 1250° C. The fired material may then be ground, sifted, formed or molded by ceramic processes with or without the addition of water or organic binders, and again fired to a temperature of between 1200° C. and 1500° C.

The firing operations above described may be carried out in any oxidizing atmosphere containing air, in an atmosphere containing waste combustion gases, or in a reducing atmosphere containing substantial quantities of hydrogen and/or carbon monoxide or other reducing gases. In a reducing atmosphere during firing or during cooling the yellow iron oxide in the ceramic ($Fe_2O_3$) is converted into the dark magnetic iron oxide ($FeO.Fe_2O_3$). In any case, it is desirable that the fired ceramic be cooled in an atmosphere of $CO$ or $CO_2$ to prevent oxidation of the ceramic. This may be accomplished by maintaining a fuel air flame during cooling of the furnace; or combustion gases may be admitted to the fired ceramic during cooling.

It is desired that the final firing operation at 1200° C. to 1500° C. be performed under such circumstances that a vitreous, non-porous ceramic of a dark color or hue be obtained. Preferably the shrinkage should not exceed 30% and may vary from 27% to 28%. Colored effects may also be obtained by incorporating vanadium, chromium or manganese compounds in the bauxite, before or after dehydration, these compounds being ground in during step 8, but in amounts never exceeding a few per cent.

If the firing is carried out below about 1200° C. the resultant product, instead of being dark and dense, will often be white to buff color, soft, porous and of low density with a very small shrinkage. If the firing be carried out above 1450° C. blow holes will often appear and the product will not be dense or non-porous.

Before the firing operation in step 13 it is most important that the plastic material contain less than about 5% to 8% of water.

If it is desired to make granules or small particles, as for abrasives, the hot disks or blocks of the ceramic from the furnace or kiln 13, or the cooled materials after being reheated to a red heat, may be cooled rapidly or may be dumped directly into water with the result that the block or disk of material will fracture or fissure or will break into a large number of granules or grains having very sharp edges and of particularly satisfactory abrasive properties.

In the above procedure it is also possible after step 10 to dampen the dried filter cake. The filter cake after drying, shrinks to form a dense, compact, homogeneous mass which upon dampening may then be broken up into pieces and these pieces may then be directly fired in the kiln or furnace of step 13 at a temperature of between 1350° C. to 1400° C., which will give a ceramic directly in granules or particles which may be crushed and/or graded for abrasive purposes. This dampening of the filter cake may be accomplished by placing the dried cake upon a moisture-containing absorbent material. The moistening may also be accomplished by steaming the dried cake.

The present application differs from copending application Serial No. 87,824, filed June 29, 1936, in that the dehydrated bauxite is finely ground to between 20 to 5 microns average size, or to an average of 12 microns or finer before forming and firing. It differs from copending applications Serial No. 87,825 and No. 87,826, filed June 29, 1936, now Patents No. 2,310,953 and 2,311,228, respectively, and Serial No. 135,369, filed April 7, 1937, now Patent No. 2,278,442, in that it does not in its preferred procedures include the vitrification catalysts such as magnesium or alkaline metal compounds.

It is an essential feature of the present invention that the ceramic product retains the original content of iron, titanium, and silicon oxides of the bauxite, thus differing from copending application Serial No. 684,760, filed August 11, 1933, which utilizes a pure alumina substantially devoid of these oxides. It is also desirable that the material upon being fired should be devoid of bonds, such as fireclay and lime.

In wet grinding or colloidizing the alumina it is generally desirable to use a flint-lined pebble mill with flint pebbles, and the grinding should be carried out under such conditions that the alumina will not take up more than about ¼% to ¾% of silica from the mill. It is generally desirable to use 25% of the aluminous composition and 75% water to make the grinding slip. The time of grinding is dependent upon the size of the pebble mill, the size of the pebbles, the quantity used and the speed of the mill. With a small mill, one gallon size, good results are obtained with fifty hours grinding, the weight of the charge being one kilogram of aluminous composition and three kilograms of water, and the mill being about one-half full of pebbles of approximately ¾" diameter. The larger the mill, the less grinding time is required due to greater action of the pebbles. The time of grinding, however, may be varied from ten to sixty hours, and the amount of water from 35% to 85% of the mix in the pebble mill. Generally at the conclusion of the wet grinding or colloidizing the alumina and metal oxides should have become partly hydrated, the alumina taking up about 3% to 7% additional water, and the silica usually remaining substantially unhydrated.

By "aluminous materials" as used in the specification and claims is meant material such as bauxite or alumina containing small amounts of vitrifying catalysts, which material contains at least a major proportion of $Al_2O_3$ and usually above 70 to 85% of $Al_2O_3$.

The process of dehydrating, fine grinding and firing described in the present application may also be applied to making aluminous ceramics from pure alumina or hydrated alumina, or from bauxite where fluxing or bonding agents, or vitrification catalysts are employed.

It is apparent that many changes could be effected in the process and procedures above described, and in the specific details thereof, without substantially departing from the invention intended to be defined in the claims, the specific description herein merely serving to illustrate certain compositions by which, in one embodiment, the spirit of the invention may be effectuated.

What is claimed is:

1. A process of producing bauxite ceramics, which comprises heating the bauxite material to a temperature above 500° C. and below about 1000° C. until it is dehydrated, wet grinding to a fineness of less than 50 microns and ranging primarily between 5 and 20 microns, forming and firing.

2. A vitreous-like, dense, non-porous, hard, amorphous 100% bauxite ceramic article possessing a conchoidal fracture and a hardness in excess of 70C on the Rockwell hardness testing machine, consisting of a conglomerated and closely coherent mass of colloidal, dehydrated bauxite particles having an average fineness less than 50 microns.

3. A process of forming ceramics from bauxite which comprises dehydrating bauxite at approximately red heat, subdividing the dehydrated bauxite first in dry state and then in wet state to a hydrated colloidal condition with an average particle size less than 50 microns, forming the ground bauxite and then firing at a temperature of 1000° C. to 1500° C.

4. In a method of making a vitreous-like, dense, non-porous, hard bauxite ceramic having a conchoidal fracture the steps including dehydrating bauxite at about red heat, and wet grinding it to a fineness of less than about 50 microns.

5. In a method of making a vitreous-like, dense, non-porous, hard, fired bauxite ceramic, having a conchoidal fracture, the steps including heating the bauxite to between about 500 and 600° C. to remove most of the water thereof, crushing the dehydrated bauxite, dry grinding the crushed bauxite to about 200 mesh, separating the particles over 200 mesh, wet grinding the 200 mesh material until at least 50% thereof is finer than 20 microns, filter pressing the wet ground material, and drying the filter cake.

6. In a process of making a vitreous-like, dense, non-porous, hard, fired bauxite ceramic from bauxite, the steps including heating said bauxite at a temperature of about a red heat until it loses substantially all of its water, then successively crushing, dry grinding and wet grinding, the dry grinding being continued until the material has been ground to less than 200 mesh, and the wet grinding being carried out until the material has been ground to less than 50 microns.

7. A vitreous-like, dense, non-porous, hard, amorphous, 100% bauxite ceramic article possessing a conchoidal fracture and a hardness in excess of 70C on the Rockwell hardness testing machine consisting of a conglomerated and closely coherent mass of colloidal, dehydrated bauxite particles having an average fineness less than 50 microns.

8. A process of producing hard, amorphous, dense, homogeneous, vitreous-like, non-porous aluminous ceramics entirely from bauxite, which comprises heating the bauxite to a temperature between about 500° C. and 600° C. until the bauxite is dehydrated, wet grinding it, pugging the ground material, forming the pugged material, and finally again heating the dehydrated bauxite to a temperature between about 1000° C. and 1500° C. until it becomes hard, dense and vitreous.

9. A process of making hard, amorphous, dense, homogeneous, vitreous-like, non-porous bauxite ceramics entirely from bauxite, which comprises heating bauxite to a red heat to dehydrate it, cooling the bauxite to room temperature, wet grinding and again heating the dehydrated bauxite to a yellow heat to cause it to become converted into an amorphous, hard, dense, and vitreous-like ceramic.

10. A vitreous-like, dense, non-porous, hard, amorphous 100% bauxite ceramic article devoid of bonding and fluxing agents possessing a conchoidal fracture and a hardness of approximately 70C to 72C on the Rockwell hardness testing machine, said ceramic article having been prepared from dehydrated, wet ground bauxite and fired at a temperature between 1000° C. and 1500° C.

11. A substantially pure, unfused ceramic bauxite article made entirely from ignited mineral bauxite having the characteristics of being hard, dense, non-porous and amorphous, said characteristics being effected by igniting at 500° C. to 600° C. and wet grinding, and then forming and firing at 1300° C. to 1400° C. without fusion.

12. The process of converting bauxite into a vitreous-like, amorphous ceramic, which comprises first dehydrating the bauxite at a low temperature of about 600° C. and wet grinding, and then forming and firing the bauxite at a relatively elevated temperature, short of fusion.

JOHN ALLEN HEANY.